(12) United States Patent
Keit et al.

(10) Patent No.: US 12,234,873 B2
(45) Date of Patent: Feb. 25, 2025

(54) ELECTROMECHANICAL PARKING BRAKE SYSTEM HAVING PARKING BRAKE LOCKING MECHANISM

(71) Applicant: HL MANDO CORPORATION, Gyeonggi-do (KR)

(72) Inventors: Alex Keit, Bay City, MI (US); Jeff Lauman, Bay City, MI (US); Troy Strieter, Bay City, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 566 days.

(21) Appl. No.: 17/579,552

(22) Filed: Jan. 19, 2022

(65) Prior Publication Data

US 2023/0228309 A1 Jul. 20, 2023

(51) Int. Cl.
| | |
|---|---|
| *F16D 65/18* | (2006.01) |
| *F16D 55/226* | (2006.01) |
| *F16D 127/02* | (2012.01) |
| *F16D 127/06* | (2012.01) |
| *F16D 129/08* | (2012.01) |

(52) U.S. Cl.
CPC ............ *F16D 65/18* (2013.01); *F16D 55/226* (2013.01); *F16D 2127/02* (2013.01); *F16D 2127/06* (2013.01); *F16D 2129/08* (2013.01)

(58) Field of Classification Search
CPC ............. F16D 2127/02; F16D 2127/06; F16D 2121/24; F16D 2129/08; F16D 65/18; F16D 55/226
See application file for complete search history.

(56) References Cited

U.S. PATENT DOCUMENTS

| | | | | |
|---|---|---|---|---|
| 6,626,270 | B2 * | 9/2003 | Drennen | F16D 65/18 188/72.1 |
| 7,677,367 | B2 * | 3/2010 | Usui | F16D 65/18 188/72.3 |
| 9,855,934 | B2 * | 1/2018 | Yasui | B60T 13/741 |
| 2003/0066719 | A1 * | 4/2003 | Watanabe | F16D 65/18 188/162 |

(Continued)

FOREIGN PATENT DOCUMENTS

| | | |
|---|---|---|
| JP | 2003-329070 | 11/2003 |
| JP | 2008-164111 | 7/2008 |

(Continued)

*Primary Examiner* — Bradley T King
(74) *Attorney, Agent, or Firm* — WOMBLE BOND DICKINSON (US) LLP (57) ABSTRACT

During an operation of applying a parking brake, when sufficient brake clamping force is applied by a brake actuator, a parking lock actuator having a pin is energized to cause the pin to be moved toward a strut so that the strut is engaged with one of notches of a rotatable part operably connected with the brake actuator in order to prevent rotation of the rotatable part in one direction of releasing the brake and to allow rotation of the rotatable part in the other direction of applying the brake, and then the parking lock actuator is de-energized and the pin is moved away from the strut. During an operation of releasing the parking brake, the brake actuator rotates the rotatable part in the brake apply direction to disengage the strut from the notch, and then releases the brake.

18 Claims, 10 Drawing Sheets

(56) References Cited

U.S. PATENT DOCUMENTS

| | | | | |
|---|---|---|---|---|
| 2005/0077782 | A1* | 4/2005 | Horiuchi | B60T 13/741 |
| | | | | 303/20 |
| 2010/0051395 | A1* | 3/2010 | Sano | B60T 13/741 |
| | | | | 188/162 |
| 2014/0257643 | A1* | 9/2014 | Dufford | B60T 1/005 |
| | | | | 701/45 |
| 2016/0244035 | A1* | 8/2016 | Yasui | B60T 7/122 |
| 2017/0234380 | A1* | 8/2017 | Yasui | F16D 63/006 |
| | | | | 188/72.1 |
| 2018/0009420 | A1* | 1/2018 | Tsukamoto | B60T 13/741 |
| 2018/0073584 | A1* | 3/2018 | Tsukamoto | F16D 63/006 |
| 2018/0135710 | A1* | 5/2018 | Sala | B60T 13/741 |
| 2018/0148022 | A1* | 5/2018 | Misumi | B60T 17/221 |
| 2020/0217379 | A1* | 7/2020 | Odaira | F16D 65/183 |

FOREIGN PATENT DOCUMENTS

| | | |
|---|---|---|
| KR | 10-2010-0030012 | 3/2010 |
| KR | 10-2010-0030285 | 3/2010 |
| KR | 10-2015-0025067 | 3/2015 |

* cited by examiner

ELECTROMECHANICAL PARKING BRAKE SYSTEM HAVING PARKING BRAKE LOCKING MECHANISM

TECHNICAL FIELD

The present disclosure generally relates to braking systems and, more particularly, to an integrated park lock system which maintains service brake clamp force in the absence of supplied motor torque or service brake apply or an electromechanically actuated parking brake systems having a parking brake locking mechanism.

BACKGROUND

A brake system for a vehicle, and in particular an automotive vehicle, functionally reduces the speed of the vehicle or maintains the vehicle in a rest position. Various types of brake systems are commonly used in automotive vehicles, including hydraulic, anti-lock or "ABS," and electric or "brake by wire." For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In the electric brake system, the application and release of the brake is controlled by an electric caliper via electrical signal.

These electric brake systems typically include an electromechanical actuator connected to a brake caliper either by a cable, as a drum in head, or directly attached to the brake caliper. The electro-mechanical actuator relies on an electric signal to operate the brake caliper. The electric signal activates a motor which drives a gear or belt system coupled to the brake caliper. The motor shifts the brake caliper so as to bring together brake pads with a rotor. Generally, the motor does not include a locking feature. Accordingly, a separate mechanism for locking a parking brake is needed to prevent movement of the vehicle when it is parked.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various exemplary embodiments of the present disclosure, an electromechanical parking brake system may comprise: a strut mechanism comprising: a strut configured to be selectively engageable with one of notches, formed on a rotatable part operably connected with a brake actuator, by being movable between an engaged position where the strut is interlocked with one of the notches formed on the rotatable part to prevent rotation of the rotatable part in one direction of releasing a brake and allow rotation of the rotatable part in an other direction of applying the brake and a disengaged position where the strut is disengaged from one of the notches of the rotatable part to allow the rotation of the rotatable part in both the directions of applying and releasing the brake, and a strut return spring configured to exert a force moving the strut toward the disengage position; and a parking lock actuator having a pin configured to be movable between actuated and unactuated positions, the parking lock actuator configured to lock a parking brake by actuating to move the pin from the unactuated position to the actuated position so that the pin moves the strut from the disengaged position to the engaged position and, when the strut is interlocked with one of the notches formed on the rotatable part operably connected with the brake actuator, being unactuated to return the pin from the actuated position to the unactuated position such that the strut remains in engaging with one of the notches formed on the rotatable part to prevent the rotation of the rotatable part in the one direction of releasing the brake and allow rotation of the rotatable part in the other direction of applying the brake. Interlock of the strut with one of notches causing the rotatable part not to rotate in the direction of releasing the brake may be maintained unless the rotatable part is rotated in the direction of applying the brake.

The brake actuator may be further configured to, in response to a signal for releasing the parking brake, rotate the rotatable part in the direction of applying the brake so that the strut is disengaged from one of the notches of the rotatable part by the force exerted by the strut return spring, and after the strut is disengaged from one of the notches of the rotatable part, rotate the rotatable part in the direction of releasing the parking brake in order to release the brake.

The parking lock actuator may comprise a solenoid configured to move the pin in response to a current supplied to the solenoid.

The rotatable part operably connected with the brake actuator may comprise a first surface facing a circuit board, a second surface facing the strut, and a curved surface positioned between the first and second surfaces. The notches may be formed on the second surface of the rotatable part facing the strut.

The strut may be configured to be pivotally rotatable between the engaged position and the disengaged position. The parking lock actuator may be configured to linearly move the pin between the actuated position and the unactuated position.

The parking lock actuator may further comprise a connector configured to electrically connect the parking lock actuator with a circuit board. A heat sink may be positioned between the parking lock actuator and the circuit board, and the connector of the parking lock actuator may pass through the heat sink.

The parking lock actuator may further comprise a pin return spring configured to exert a force moving the pin of the parking lock actuator toward the unactuated position so that the pin of the parking lock actuator can be returned to the unactuated position by the force of the pin return spring when the parking lock actuator is unactuated.

The pin of the parking lock actuator or a direction of linear movement of the pin of the packing lock actuator may be parallel to an axis of which a brake rotor rotates.

Each of the notches may have first and second surfaces angled asymmetrically to prevent the rotation of the rotatable part in one direction of releasing the brake and allow the rotation of the rotatable part in the other direction of applying the brake in a state that the strut is engaged with one of the notches.

According to some exemplary embodiments of the present disclosure, a method of controlling an electromechanical parking brake system may comprise: in response to a signal for applying a parking brake, applying, by a brake actuator, a brake clamping force to a rotor; after the brake clamping force is applied to the rotor, energizing a parking lock actuator having a pin to cause the pin to be moved toward a strut so that the strut is moved from a disengaged position to an engaged position by the pin of the parking lock actuator, wherein in the engaged position the strut is interlocked with one of notches formed on the rotatable part to prevent rotation of the rotatable part in one direction of releasing the brake and allow rotation of the rotatable part in an other direction of applying the brake, and in the disengaged position the strut is disengaged from one of the notches of the rotatable part to allow the rotation of the rotatable part in both the directions of applying and releasing the brake; and after the strut is engaged with one of the notches formed on the rotatable part, de-energizing the parking lock actuator such that the pin is moved away from the strut by an elastic force exerted by a pin return spring. Interlock of the strut with one of notches causing the rotatable part not to rotate in the direction of releasing the brake can be maintained unless the rotatable part is rotated in the direction of applying the brake.

The method may further comprise: in response to a signal for releasing the parking brake, rotating the rotatable part in the direction of applying the parking brake so that the strut is disengaged from one of the notches of the rotatable part by an elastic force exerted by a strut return spring; and after the strut is disengaged from one of the notches of the rotatable part, rotating the rotatable part in the direction of releasing the parking brake in order to release the parking brake. The method may further comprise, after the brake clamping force is applied to the rotor and before the parking lock actuator is energized, decreasing torque generated by the brake actuator. The method may further comprise, after de-energizing the parking lock actuator such that the pin is moved away from the strut, verifying whether a park set is performed successfully, and if the park set is not performed successfully, repeating the applying of the brake clamping force, the energizing of the parking lock actuator, and the de-energizing of the parking actuator.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1A:
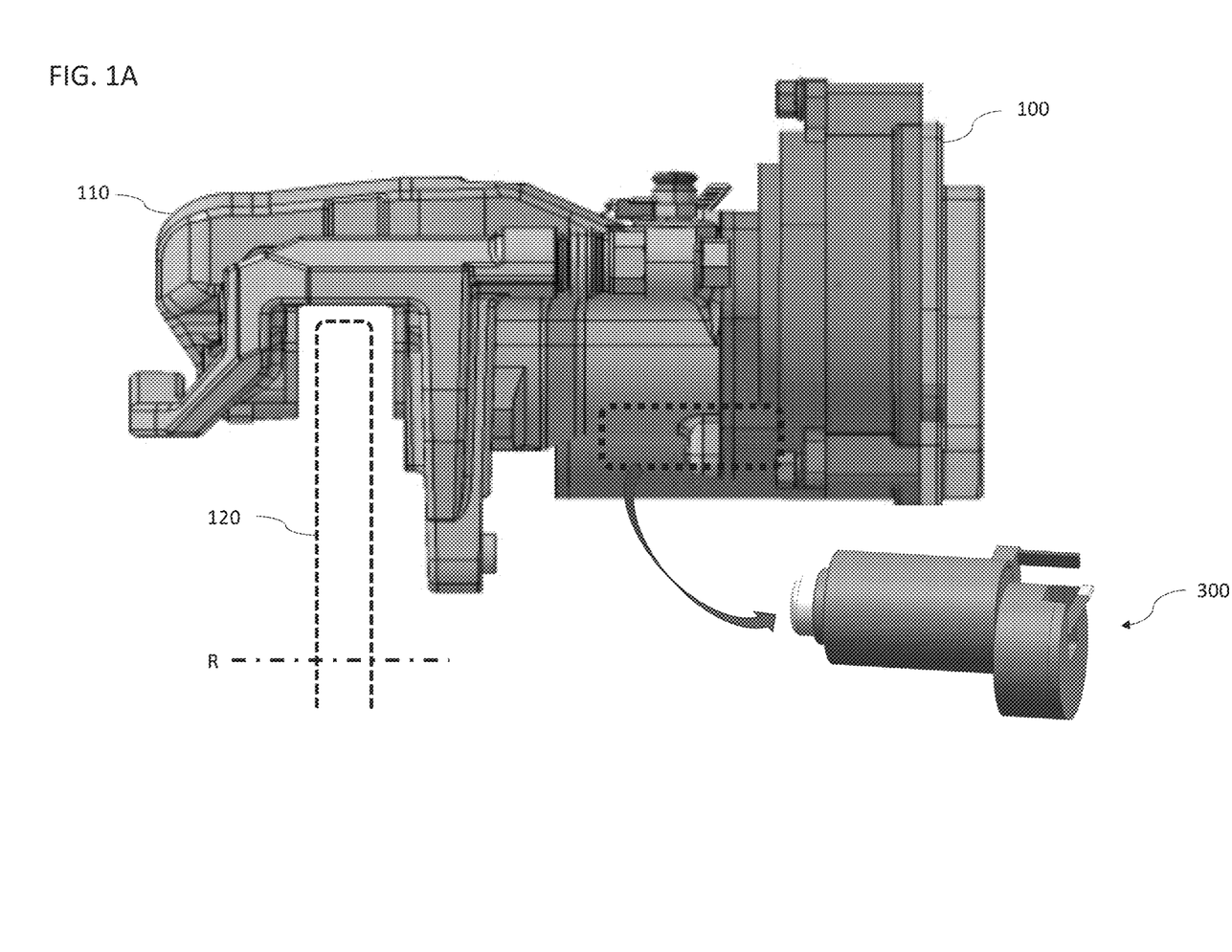
FIG. 1A shows a side view of an electromechanical actuator package coupled to a brake assembly according to an exemplary embodiment of the present disclosure.
Figure 1B:
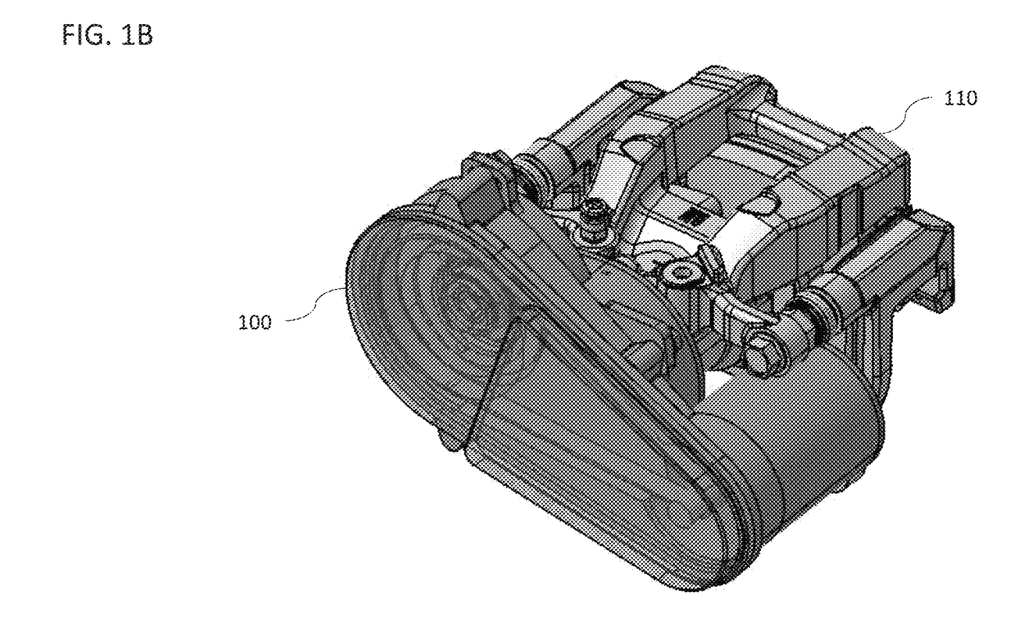
FIG. 1B shows a top perspective view of an electromechanical actuator package coupled to a brake assembly according to an exemplary embodiment of the present disclosure.

FIGS. 1A and 1B illustrate an exemplary embodiment where an electromechanical actuator package is coupled to a brake assembly. As shown in FIGS. 1A and 1B, an electromechanical actuator package 100 may be directly mounted or indirectly connected to a brake assembly, for example, but not limited to, a brake caliper 110. The electromechanical actuator package 100 may be configured to actuate or drive the brake caliper 110. The electromechanical actuator package 100 can supply braking force to the brake caliper 110 through an actuator output 260 of FIG. 2. The electromechanical actuator package 100 may comprise a parking brake locking mechanism 300 configured to lock a parking brake in order to maintain the braking force without power supply. The electromechanical actuator package 100 may be coupled to the brake caliper 110 for applying the brakes using a variety of ways. For example, the actuator output 260 of FIG. 2 of the electromechanical actuator package 100 may be attached to a ball screw mechanism 290 of the brake caliper 110 to generate an axial force for actuating a brake. The electromechanical actuator package 100 may be mounted to any suitable portion of a vehicle, including frame, body, and trim components.

Figure 2:
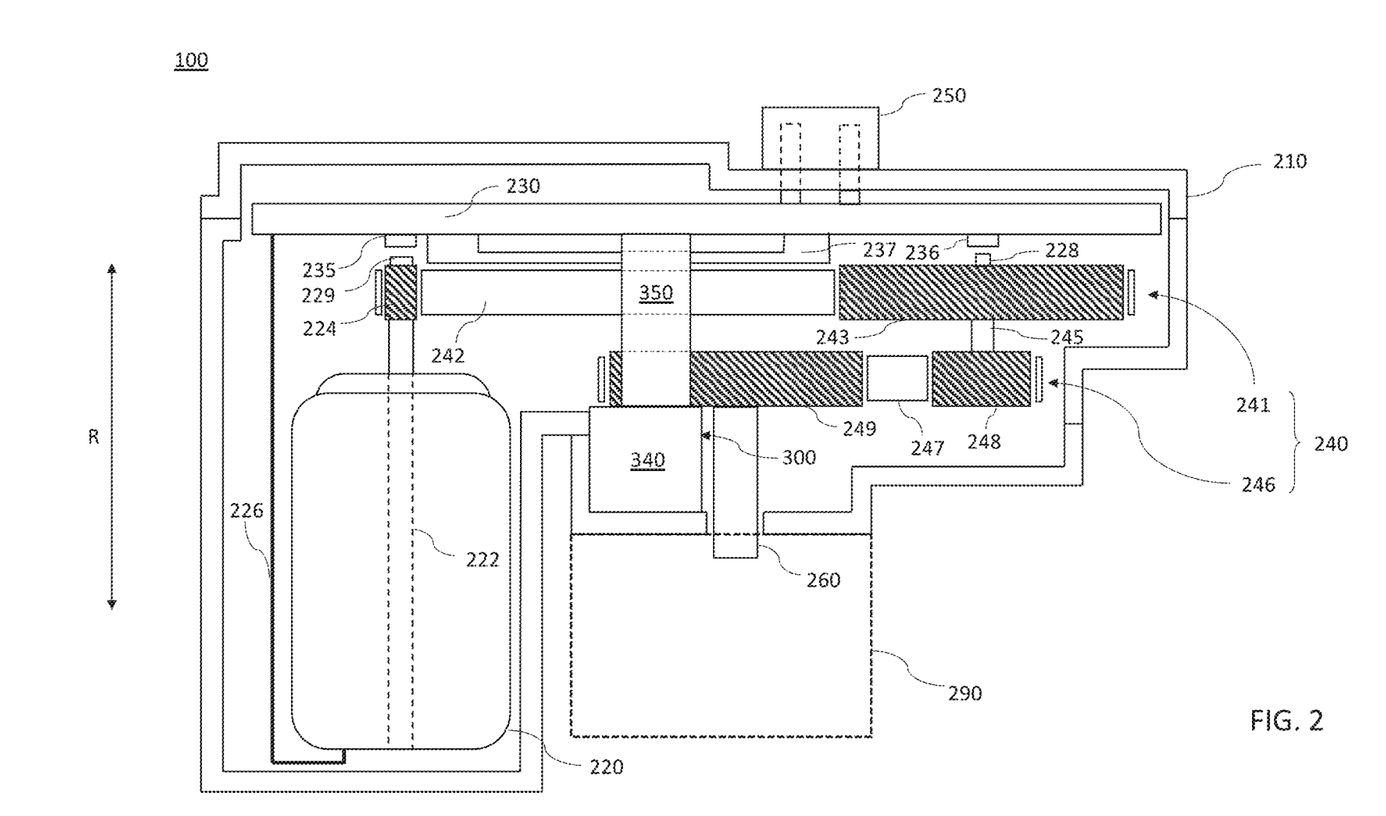
FIG. 2 shows a cross-sectional view of an electromechanical actuator package according to an exemplary embodiment of the present disclosure.

FIG. 2 shows a cross-sectional view of an electromechanical actuator package according to an exemplary embodiment of the present disclosure.

A motor 220 may be fixedly mounted in a housing 210 of the electromechanical actuator package 100. The motor 220 may an electric motor, and includes a motor rotor shaft 222 axially extending toward a circuit board 230. The motor 220 may be electrically connected to the circuit board 230 and/or an electric connector 250 via one or more electrical conductors 226. The electrical conductors 226 may connect the motor 220 to appropriate terminals on the circuit board 230 or the electric connector 250. The motor 220 may be actuated and controlled by the circuit board 230 for providing the desired rotational speed, torque and rotational direction of the motor rotor shaft 222 of the motor 220. Alternatively, the motor 220 may be electrically connected to an external device via the electric connector 250 and be actuated and/or controlled by the external device, such as a controller disposed outside of the electromechanical actuator package 100 and/or an external power supplier, via the electric connector 250 and be actuated and/or controlled by the external device.

The drive pulley 224 may be formed directly on the motor rotor shaft 222 by machining the drive pulley 224 on the circumferential surface of the motor rotor shaft 222 or attached to the motor rotor shaft 222 by being mounted to and pressed in the motor rotor shaft 222 as a separate piece from the motor rotor shaft 222. The drive pulley 224 may have an outer surface that engages an inner surface of the drive belt 242. The outer surface of the drive pulley 224 can have any suitable contour or texture to help ensure a gripping contact between the drive belt 242 and the drive pulley 224. For example, the outer surface of the toothed pulley 224 and the inner surface of the drive belt 242 can include toothed mating protrusions and/or notches formed therein. The drive pulley 224 may have alternating teeth and grooves on its outer surface to be meshed with alternating grooves and teeth formed on the inner surface of the drive belt 242.

The drive pulley 224 of the motor rotor shaft 222 is rotatably engaged with a multi-stage belt drive mechanism 240. In the exemplary embodiment, the multi-stage belt drive mechanism 240 may be a dual-stage belt drive mechanism comprising a first stage belt assembly 241 and a second stage belt assembly 246. The multi-stage belt drive mechanism 240 may be configured to multiply torque from the motor 220 to supply braking force to the brake caliper 110 via the actuator output 260.

The first stage belt assembly 241 may comprise a first stage drive belt 242 and a first stage driven pulley 243. The drive pulley 224 of the motor rotor shaft 222 and the first stage driven pulley 243 of the multi-stage belt drive mechanism 240 are rotatably connected to each other via the first stage drive belt 242. Each of the drive pully 224 and the first stage driven pulley 243 has an outer surface that engages an inner surface of the first stage drive belt 242. The surfaces of the drive pulley 224 and the first stage driven pulley 243 can have any suitable contour or texture to help ensure a gripping contact between the belt 242 and the pulleys 224, 243. For example, the surfaces of the pulleys 224 and 243 and the inner surface of the belt 242 can include toothed mating protruding and/or notches formed therein.

The first stage drive belt 242 is fit relatively snugly about the outer circumferences of the drive pully 224 and the first stage driven pulley 243. Thus, rotational movement of the drive pulley 224 of the motor rotor shaft 222 causes rotation of the first stage driven pulley 243 of the dual-stage belt drive mechanism 240.

The multi-stage belt drive mechanism 240 may further comprise a connecting shaft 245 connecting the first stage belt assembly 241 to a second stage belt assembly 246. For example, the connecting shaft 245 may connect the first stage driven pulley 243 of the first stage belt assembly 241 to the second stage drive pulley 248 of the second stage belt assembly 246 in order to deliver torque of the first stage driven pulley 243 to the second stage drive pulley 248. The diameters of the first stage driven pulley 243 of the first stage belt assembly 241 and the second stage drive pulley 248 of the second stage belt assembly 246 may be any suitable dimension for providing the optimized reduction ratio and motor output torque. In the exemplary embodiment, the diameter of the first stage driven pulley 243 is larger than the diameter of the second stage drive pulley 248. The connecting shaft 245 may be positioned substantially axially parallel to the motor rotor shaft 222, however the orientation of the connecting shaft 245 may be altered.

The multi-stage belt drive mechanism 240 may further include the second stage belt assembly 246. The second stage belt assembly 246 may comprise a second stage drive belt 247, the second stage drive pulley 248 and a second stage driven pulley 249. The second stage belt assembly 246 may be configured to further multiply the torque delivered from the first stage belt assembly 241 and provide the multiplied torque to the actuator output 260. The second stage drive pulley 248 and the second stage driven pulley 249 are rotatably connected to each other via the second stage drive belt 247. Each of the second stage drive pulley 248 and the second stage driven pulley 249 has an outer surface that engages an inner surface of the second stage drive belt 247. The surfaces of the second stage drive pulley 248 and the second stage driven pulley 249 can have any suitable contour or texture to help ensure a gripping contact between the belt 247 and the pulleys 248, 249. For example, the surfaces of the pulleys 248 and 249 and the inner surface of the belt 247 can include toothed mating protrusions and/or notches formed therein.

Although FIG. 2 illustrates the multi-stage mechanism 240 as a two-stage belt drive mechanism, one skilled in the part would understand that the multi-stage mechanism 240 can be implemented as a single-stage drive mechanism or a three or more stage mechanism or a gear drive mechanism.

The second stage driven pulley 249 may be associated with the actuator output 260. The actuator output 260 may be formed directly on a side of the second stage driven pulley 249 or fixedly coupled to the second stage drive pulley 249. The actuator output 260 may have various shapes that can be coupled to a part of the brake assembly. In the exemplary embodiment, the actuator output 260 of the electromechanical actuator package 100 may be attached to the ball screw mechanism 290 of the brake caliper 110 to generate axial force for actuating a brake.

The circuit board 230 may be mounted inside of the housing 210. In the exemplary embodiment, the circuit board 230 may be fully contained within the housing 210. The circuit board 230 may be installed between the motor 220 and the inner surface of the circuit board 230. For example, the circuit board 230 may be disposed in the uppermost portion of the housing 210. The circuit board 230 may be arranged generally perpendicular to the axis of the motor rotation shaft 222, although it is not required.

The circuit board 230 may comprise any suitable circuitry and electronic components, such as a microprocessor, mounted thereon. The circuit board 230 may be configured to control the motor 220 and a parking lock actuator 340 of the parking brake locking mechanism 300, for example, but not limited to, supply power to the motor 220 and the parking lock actuator 340, and activate or deactivate the operation of the motor 220 and the parking lock actuator 340. The parking lock actuator 340 may be connected to the circuit board 230 by a connector 350. The circuitry and electronic components can be mounted on either or both sides of the circuit board. For example, a motor position sensor 235 configured to detect an angular position, rotational speed or rotational direction of the motor rotation shaft 222 is mounted on the circuit board 230, a shaft position sensor (or a redundant motor position sensor) 236 configured to detect an angular position, rotational speed or rotational direction of the connecting shaft 245 (and/or the first stage driven pulley 243) may be further mounted on the circuit board 230, and one or more leads of the connector 350 of the parking brake locking mechanism 300 may be soldered on the bottom surface of the circuit board 230.

A heat sink 237 may be configured to discharge heat extracted from the circuit board 230. The heat sink 237 may be provided with heat exchanger fins or other cooling surfaces. The heat sink 237 may be arranged between the circuit board 230, and a strut mechanism 310 and/or the parking lock actuator 340 of the parking lock mechanism 340.

The parking brake locking mechanism 300 may be included in, or attached to, the electromechanical actuator package 100. The internal integration of the parking brake locking mechanism 300 into the electromechanical brake actuator package 100 may create a sealed environment to house the parking brake locking mechanism 300. The containment within the housing 210 of the electromechanical actuator package 100 may protect the parking brake locking mechanism 300 from environmental corrosion as well as debris or contaminants that could cause the parking brake locking mechanism 300 to malfunction. The parking brake locking mechanism 300 will be described in detail in the following with reference to FIG. 3A to FIG. 8.

Figure 3A:
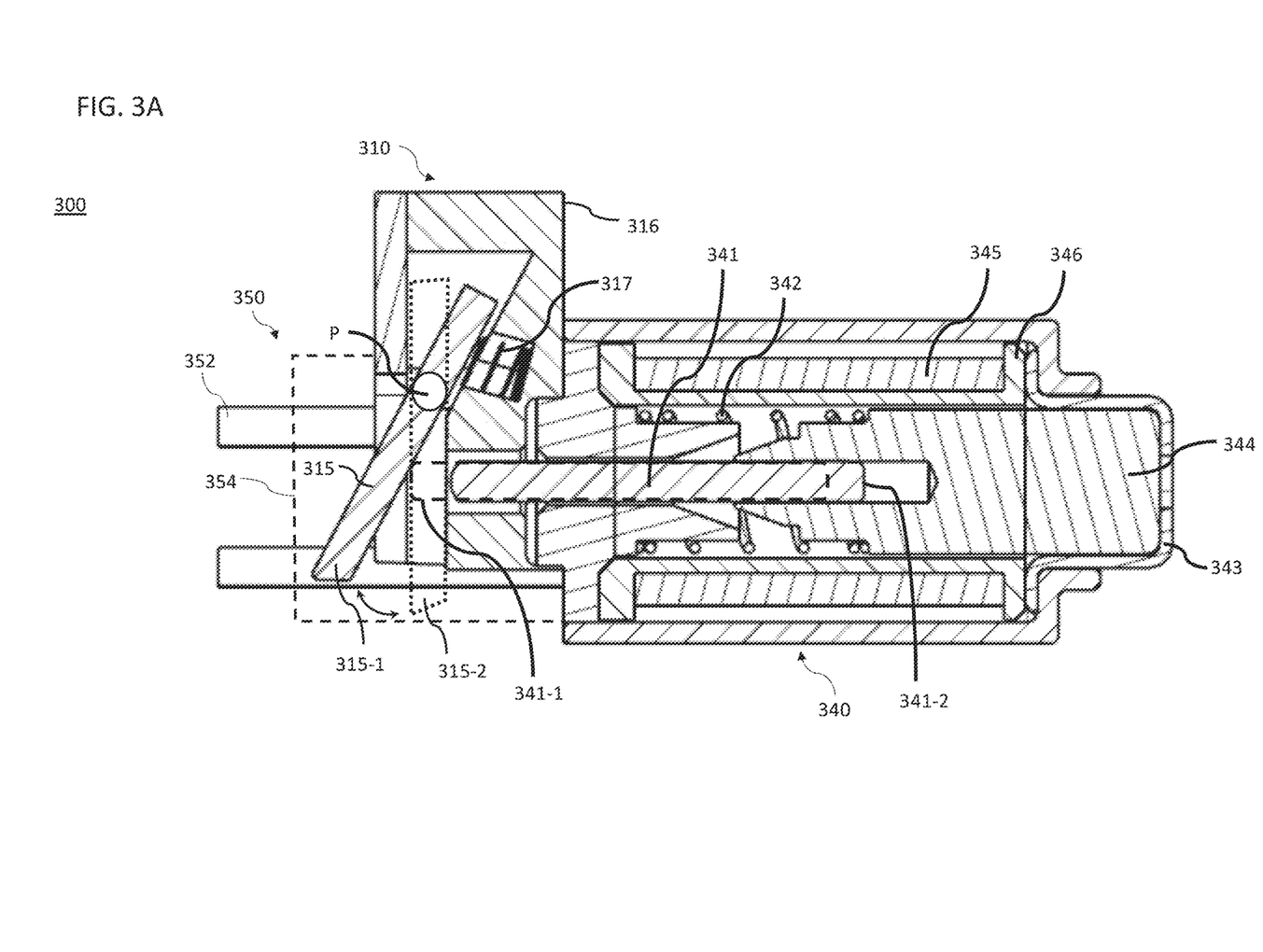
FIG. 3A shows a cross-section view of a parking brake locking mechanism according to an exemplary embodiment of the present disclosure.
Figure 3B:
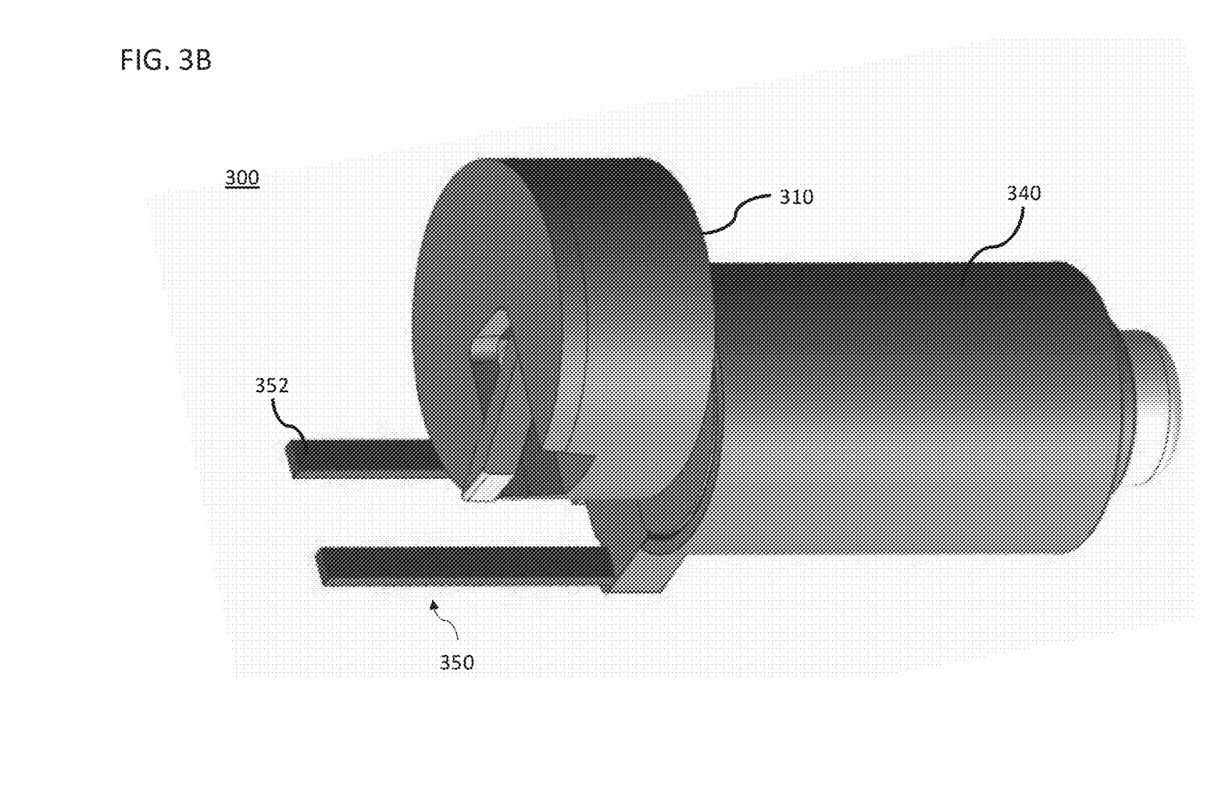
FIG. 3B is a perspective view of a parking brake locking mechanism according to an exemplary embodiment of the present disclosure.
Figure 4:
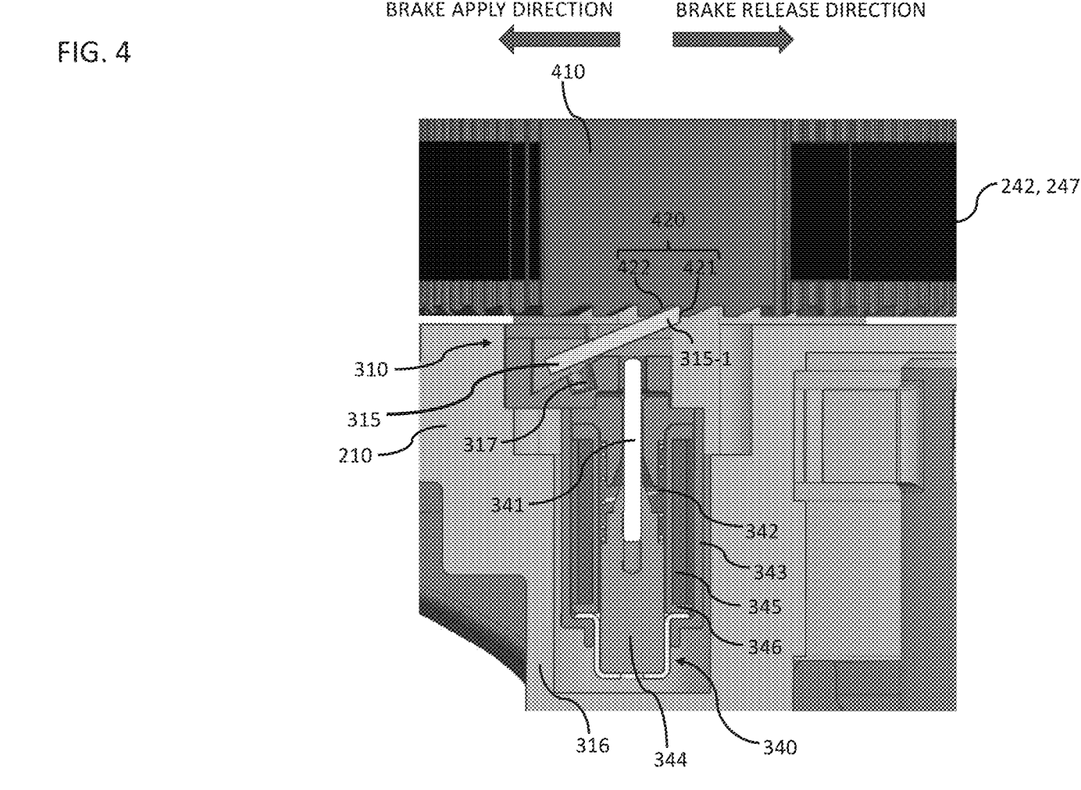
FIGS. 4 and 5 are partial cross-sectional views of an electromechanical actuator packaging including a parking brake locking mechanism according to an exemplary embodiment of the present disclosure.
Figure 5:
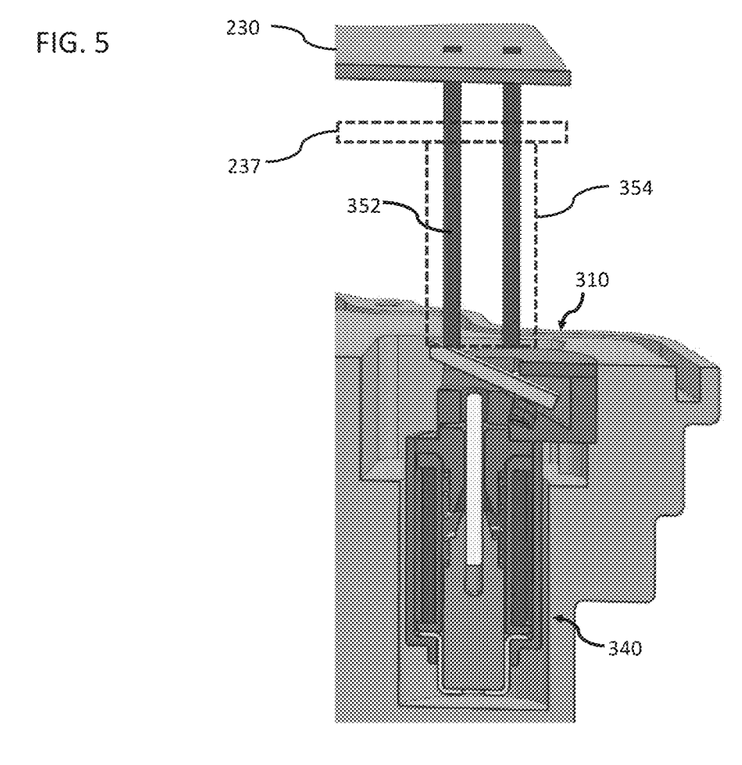
Figure 6:
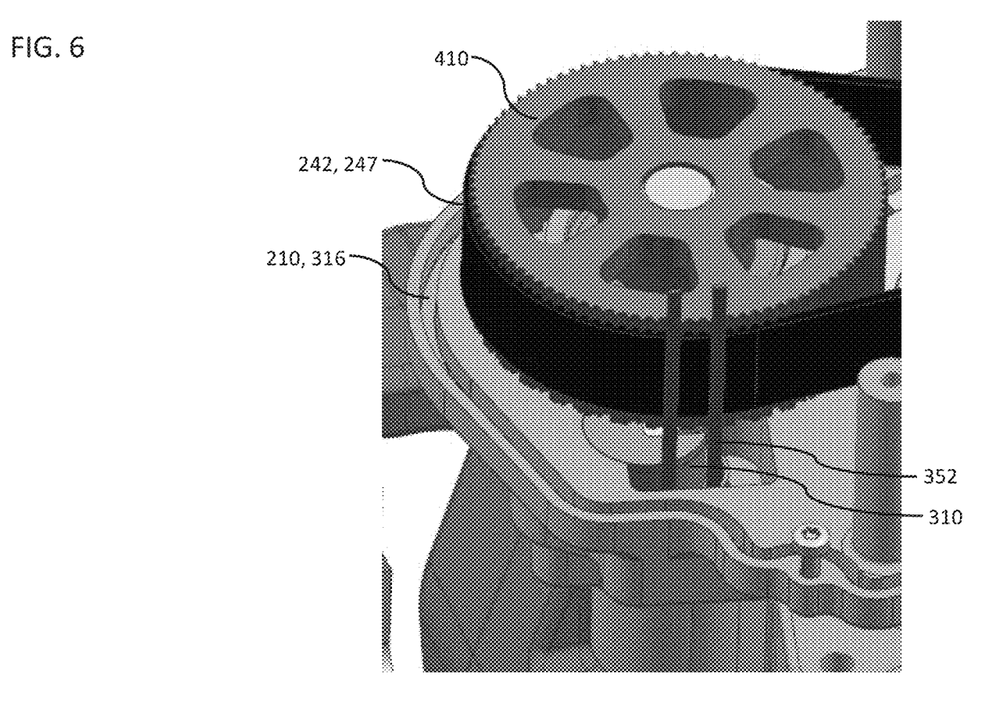
FIG. 6 is a partial inside view of an electromechanical actuator packaging including a parking brake locking mechanism according to an exemplary embodiment of the present disclosure.

FIG. 3A is a cross-section view of a parking brake locking mechanism according to an exemplary embodiment of the present disclosure. FIG. 3B is a perspective view of a parking brake locking mechanism according to an exemplary embodiment of the present disclosure. FIGS. 4 and 5 are partial cross-sectional views of an electromechanical actuator packaging including a parking brake locking mechanism according to an exemplary embodiment of the present disclosure. FIG. 6 is a partial inside view of an electromechanical actuator packaging including a parking brake locking mechanism according to an exemplary embodiment of the present disclosure.

A brake actuator such as the motor 220 of FIG. 2 is selectively activated to shift the brake caliper 110 of FIG. 1 to deliver a brake clamping force to the rotor 120 (e.g. a brake disk) in order to perform a parking brake operation. The motor 220 is mechanically connected to a rotatable part 410 to rotate the rotatable part 410 in a direction for applying the brake or a direction for releasing the brake. The rotatable part 410 may be a pulley, gear or any rotatable component operably connected with the brake actuator. The rotatable part 410 can be directly coupled to the brake actuator (e.g. the motor 220) or indirectly connected with the brake actuator (e.g. the motor 220) through any other components such as a gear, a pulley, a belt, an wire and so on. In the embodiment illustrated in FIG. 2, the parking brake locking mechanism 300 can be positioned adjacent to any one of the pulleys 224, 243, 248, 249. However, in FIG. 2, for illustration purposes, the parking brake locking mechanism 300 is located adjacent to the second stage driven pulley 249 associated with the actuator output 260, but not limited thereto.

The parking brake lock mechanism 300 is configured to, if the parking brake is applied to prevent movement of a vehicle, lock rotation of the rotatable part 410 in order to halt rotation of the rotor 120 when the brake actuator such as the motor 220 is de-energized. Referring to FIGS. 3A to 6, the parking brake locking mechanism 300 may comprise a strut mechanism 310 and a parking lock actuator 340. Although FIG. 1A illustrates the rotor 120 as a brake disk, the brake disk is merely one example of the rotor 120. It should be appreciated that embodiments of the present disclosure should not be limited to the brake disk. The rotor may be any component directly or indirectly fixed to a vehicle wheel and rotatable with the vehicle wheel, for example, but not limited to, a drum and the like.

Figure 7:
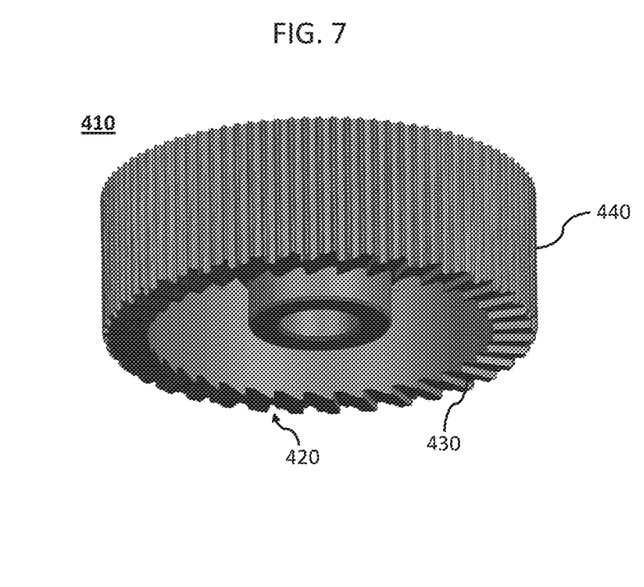
FIG. 7 is a bottom perspective view of a rotatable part according to an exemplary embodiment of the present disclosure.

The strut mechanism 310 comprises a strut 315. The strut 315 may be configured to be selectively engageable with one of notches 420 formed on the rotatable part 410. As illustrated in FIGS. 4 and 7, alternating teeth and notches 420 may be formed on a surface of the rotatable part 410 facing the parking brake locking mechanism 300. For example, the bottom (or top) surface 430 of the rotatable part 410 facing the parking brake locking mechanism 300 has alternating teeth and notches 420 while alternating teeth and grooves formed on a side surface 440 of the rotatable part 410 is rotatably engageable with a belt or other gear.

Figure 8:
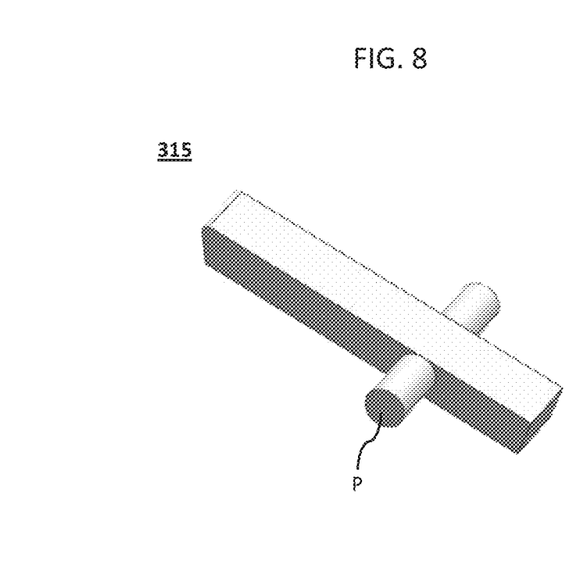
FIG. 8 is a perspective view of a strut of a parking brake locking mechanism according to an embodiment of the present disclosure.

The strut 315 may be configured to be pivotally rotatable between an engaged position 315-1 and a disengaged position 315-2. The strut 315 is pivotably supported by a strut housing 316 or the housing 210 of the electromechanical actuator package 100, and is able to rotate relative to the strut housing 316 or the housing 210 about a pivot axis P. The strut housing 316 may be secured to the housing 210 of the electromechanical actuator package 100 using securement means, such as screws, snaps, clips or the like. When the strut 315 is in the engaged position 315-1, the strut 315 is interlocked with one of the notches 420 of the rotatable part 410 such that the interlock of the strut 315 with one of the notches 420 causes to prevent the rotation of the rotatable part 410 in only one direction of releasing a brake in order to halt the rotation of the brake rotor 120. However, the rotatable part 410 is still rotatable in the other direction of applying the brake even when the strut 315 is in the engaged position 315-1, but if the rotatable part 410 is rotated in the brake apply direction, the strut 315 is released from the interlock with the notch 420 of the rotatable part 410 and is disengaged from the notch 420 of the rotatable part 410. When the strut 315 is in the disengaged position 315-2, the strut 315 is not engaged with any one of the notches 420 of the rotatable part 410 so that the rotatable part 410 can freely rotate in both the brake release direction and the brake apply direction. An example of the strut 315 is shown in FIG. 8.

Each of notches 420 of the rotatable part 420 engageable with the strut 315 may comprise two surfaces, a first surface 421 and a second surface 422. The first surface 421 and the second surface 422 of the notch 420 may be symmetric or asymmetric to each other. In the exemplary embodiment illustrated in FIG. 4, the first surface 421 and the second surface 422 of the notch 420 are angled asymmetrically to each other so that, when the strut 315 is engaged with the notch 420, the rotatable part 410 cannot be rotated in the brake release direction but the rotatable part 410 is rotatable in an opposite direction which is the brake apply direction. For instance, the plane of the first surface 421 of the notch 420 may be parallel to a rotation axis of the rotatable part 410, and the plane of the second surface 422 of the notch 420 may be at a non-zero angle relative to the rotation axis of the rotatable part 410. However, the first and second surfaces 421, 422 of the notch 420 can be angled at any angle that, when the strut 315 is interlocked with one of the notches 420 of the rotatable part 410, the rotation of the rotatable part 410 in the brake apply direction is allowed while the rotation of the rotatable part 420 in the brake release direction is prevented. At least one of surfaces of an end portion of the strut 315 engageable with the notch 420 may be angled to correspond to the slanted angles of the first and/or second surfaces 421, 422 of the notch 420.

Although the strut 315 can be implemented as a plurality of pawls or teeth, the embodiment of the present disclosure describes the strut 315 as a single strut because the single strut 315 can be easily and rapidly released from the engagement with one of the notches 420 of the rotatable part 410 when the rotatable part 410 is rotated in the brake apply direction in the state that the strut 315 is in the engaged position 315-1.

The strut mechanism 310 may further comprise a strut return spring 317. The strut return spring 317 may be configured to exert an elastic restoring force moving the strut 315 toward the disengage position 315-2 when the strut 315 is in the engaged position 315-1. However, when the strut 315 is interlocked with one of the notch 420 of the rotatable part 410, the strut return spring 317 cannot move the strut 315 from the engaged position 315-1 to the disengage position 315-2 because the strut 315 is in position and held or stuck in one of the notch 420 of the rotatable part 410. However, when the rotatable part 410 is rotated in the brake apply direction, the strut 315 is released from the interlock with one of the notches 420 of the rotatable part 410 and therefore the strut 315 is moved from the engaged position 315-1 to the disengaged position 315-2 by the elastic restoring force of the strut return spring 317. The strut return spring 317 may be, for example, but not limited to, a coil type spring, a plate type spring, and any biasing element or means that can generate an elastic restoration force.

The parking lock actuator 340 may be configured to lock the parking brake by actuating to move a pin 341 toward the strut 315 to push the strut 315 of the strut mechanism 310 toward the notches 420 of the rotatable part 410. The pin 341 of the parking lock actuator 340 may be configured to be movable between an actuated position 341-1 and an unactuated position 341-2. When the parking lock actuator 340 is actuated, the pin 341 moves the strut 315 from the disengaged position 315-2 to the engaged position 315-1 so that the strut 315 can be engaged and interlocked with one of the notches 420 of the rotatable part 410. The force generated by the parking lock actuator 340 pushing the pin 341 toward the rotatable part 410 may be greater than the elastic forces of the strut return spring 317 and a pin return spring 342 in order to outwardly move the pin 341 and push the strut 315 to the engaged position by overcoming those elastic forces. When the parking lock actuator 340 is de-energized or unactuated, the pin 341 is returned from the actuated position to the unactuated position, for example, from an extended position to a retracted position, by the elastic force of the pin return spring 342 urging the pin 341 toward the unactuated position (e.g. the retracted position). The pin return spring 342 ensures that the pin 341 remains in the unactuated position such as the retracted position until the parking lock actuator 340 is energized.

The pin 341 of the parking lock actuator 340 or the linear-movable direction of the pin 341 of the parking lock actuator 340 is parallel to the rotation axis R of which the rotor 120 rotates. This orientation may minimize the possibility of accidental engagement due to vibration or impact as the action is perpendicular to the axis these vibrations and the impacts are severe and common to a corner level brake assembly. Alternatively, the pin 341 of the parking lock actuator 340 or the linear-movable direction of the pin 341 of the parking lock actuator 340 is not required to be parallel to the rotation axis R of the rotor 120, and the pin 341 of the parking lock actuator 340 or the linear-movable direction of the pin 341 of the parking lock actuator 340 can be angled at any appropriate angle with respect to the rotation axis R of the rotor 120.

The parking lock actuator 340 may take the form of an electric solenoid. The solenoid is mounted in the parking lock actuator housing 343. The solenoid may be a dual position, dual stable state device typically having an armature 344 having a magnet or magnetic material and coil windings 345. The armature 344 and the windings 345 are all mounted within the parking lock actuator housing 343. The pin 341 may be fixedly coupled to the armature 344 as a separate element, or may be a protrusion part of the armature 344. The armature 344 is slidably received in a sleeve 346, and the coil windings 345 are about the sleeve 346. To activate the parking lock actuator 340, electric current is supplied to the coil windings 345. The current establishes a magnetic field in the armature 344, which pushes the armature 344 in an outward direction, moving the pin 341 toward the strut 315. Accordingly, when the coil windings 345 are energized to produce the electromagnetic field, the armature 344 is outwardly pushed from its original position 341-2. However, when the coil windings 345 are de-energized, the electromagnetic field disappears and this allows the pin return spring 342 to return the armature 344 to the original position 341-2 in an inward direction, moving the pin 341 away from the strut mechanism 310 or the rotatable part 410. Although some embodiments of the present disclosure illustrate the parking lock actuator 340 as a solenoid, the solenoid is merely one example of the parking lock actuator 340. It should be appreciated that embodiments of the present disclosure should not be limited to the solenoid. One having ordinary skill in the art would understand that the parking lock actuator 340 can be any actuator which can move the pin 341 between the actuated and unactuated positions in response to current supplied to the parking lock actuator 340.

The parking lock actuator 340 further comprises a connector 350. The connector 350 of the parking lock actuator 340 comprises one or more leads 352 electrically connecting the parking lock actuator 340 (e.g. the solenoid) with the circuit board 230 and/or the electric connector 250. The leads 352 may include a lead for supplying power to the parking lock actuator 340 and a lead for ground. The parking lock actuator 340 may be actuated and controlled by the circuit board 230. Alternatively, the parking lock actuator 340 may be electrically connected to an external device via the electric connector 250 and be actuated and/or controlled by the external device, such as a controller disposed outside of the electromechanical actuator package 100 and/or external power supplier, via the electric connector 250 and be actuated and/or controlled by the external device. A connector housing 354 covering and guiding or supporting the leads 352 of the parking lock actuator 340 extends from the parking lock actuator housing 343 toward the circuit board 230. As illustrated in FIG. 5, the connector housing 354 passes through the heat sink 237 so that the leads 352 of the parking lock actuator 340 can be directly connected to the circuit board 230 and/or the electric connector 250 for efficient assembly, improved reliability, and lower cost. For example, the leads 352 of the parking lock actuator 340 may be directly soldered on the circuit board 230.

Figure 9:
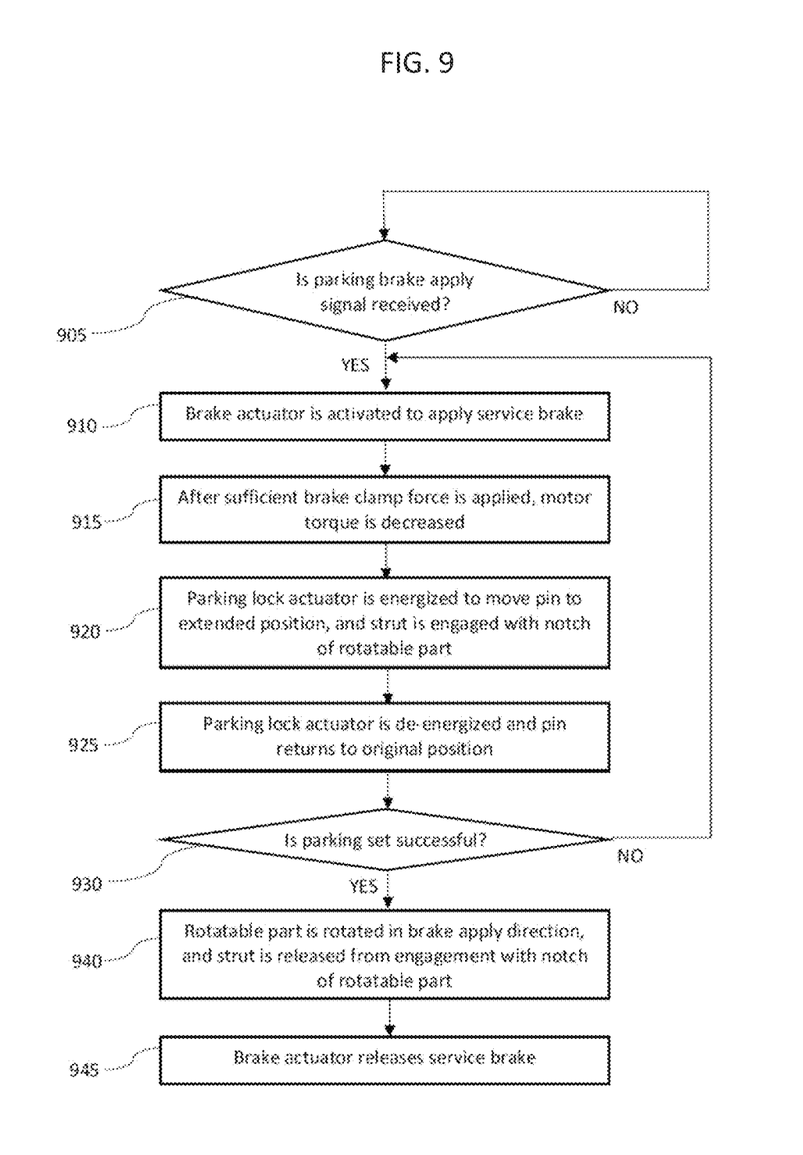
FIG. 9 is a flow chart of a method of a controlling an electromechanical parking brake system according to an exemplary embodiment of the present disclosure.

FIG. 9 is a flow chart of a method of a controlling an electromechanical parking brake system according to an exemplary embodiment of the present disclosure.

When a signal for applying a parking brake is received (step 905), the brake actuator such as the motor 220 is activated causing the brake caliper 110 to apply a brake clamping force that prevents movement of the vehicle through the electromechanical actuator package 100 and the ball screw mechanism 290 (step 910). For example, at step 910, the motor 220 applies a service brake. During step 910, the torque generated by the brake actuator is transferred to the rotatable part 410 through other components such as a gear, a pulley, a belt, a wire and so on so that the rotatable part 410 is rotated by the motor 220 in the brake apply direction.

If the brake is properly engaged by applying sufficient brake clamping force to a rotor, the motor torque generated by the motor 220 is decreased to allow the strut 310 to be engaged with one of the notches 420 of the rotatable part 410 (step 915). For instance, the torque generated by the motor 220 can be reduced until the strut 310 is engaged with one of the notches 420 of the rotatable part 410. At the same time or immediately after step 915 the parking lock actuator 340 is energized, causing the pin 341 to be moved from the retracted position 341-2 to the extended position 341-1 so that the pin 341 pushes the strut 315 toward the rotatable part 410 so as to pivotally rotate the strut 310 from the disengaged position where the strut 310 is not engaged with any one of the notches 420 of the rotatable part 410 to the engaged position where the strut 310 is engaged and interlocked with one of the notches 420 of the rotatable part 410 (step 920). The rotor may be a component directly or indirectly fixed to a vehicle wheel and rotatable with the vehicle wheel. For example, as shown in FIG. 1A, the rotor may be a brake disk 120, but not limited thereto. The rotor can be any rotatable component rotatable with a vehicle wheel, such as a drum and the like.

After the strut 310 is interlocked with one of the notches 420 of the rotatable part 410 so that the rotatable part 410 is incapable of rotating in the brake release direction (step 920), the parking lock actuator 340 is de-energized and the motor torque generated by the motor 220 is released and then the pin return spring 342 urges the pin 341 to be returned from the actuated position (e.g. an extended position) to the unactuated position (e.g. a retracted position) in a direction moving the pin 341 away from the strut mechanism 310 or the rotatable part 410 by the elastic restoration force of the pin return spring 342 (step 925).

However, even after the pin 341 pushing the strut 310 is returned to the unactuated position (e.g. the retracted position), the strut 340 is in place and maintains the engagement with the notch 420 of the rotatable part 410. In the parking brake state, the engagement/interlock of the strut 340 with the notch 420 of the rotatable part 410 can be maintained because when the brake actuator is de-energized the force against the brake clamping force in the direction of releasing the brake is generated between the brake pads of the rotor 120 (e.g. a brake disk) and the brake caliper but the strut 340 halts the rotation of the rotatable part 410 in the brake release direction. According, the power can be terminated to the parking lock actuator 340 and the strut mechanism 310 remains in the parking brake state by locking the rotation of the rotatable part 410 in the direction of releasing the brake. This "cam in" locking design of the strut mechanism 310 and the rotatable part 410 allows the power to be removed from the parking lock actuator 340 such as a solenoid while maintaining the brake clamp force without reduction of the brake clamp force in the power off condition.

After step 925, whether the parking set has been successfully performed is verified (step 930). For example, the verification operation of step 930 can be performed by a processor or controller mounted to the circuit board 230 or an external controller disposed outside of the electromechanical actuator package 100. If at step 930 it is determined that the parking set has not been successfully performed, the operations of steps 910 to 930 described above may be repeated until the parking set is verified.

When a signal for releasing the parking brake is received (step 940), the brake actuator such as the motor 220 is activated causing the rotatable part 410 to rotate in the brake apply direction (step 945). The strut 315 can be disengaged from the notch 420 of the rotatable part 410 by applying a service brake or a motor torque. When the rotatable part 410 is rotated in the brake apply direction by the brake actuator, the strut 315 is released from the engagement/interlock with one of the notches 420 of the rotatable part 410 and then the strut return spring 317 urges the strut 315 to be moved from the engaged position 315-1 to the disengaged position 315-2 by the elastic restoring force of the strut return spring 317, and therefore the parking lock state is released. The strut 315 is urged out of the engagement with one of the notches 420 by the rotation of the rotatable part 420 in the direction of applying the brake and a force of the strut return spring 317. The force of the strut return spring 317 is effective to urge the strut 315 away from the engagement with one of the notches 420 when the rotatable part 410 is rotated in the brake apply direction.

After the strut 315 is disengaged from one of the notches 420 of the rotatable part 410 (step 945), the brake actuator (e.g. the motor 220) generates torque causing the brake caliper 110 to release the brake clamping force and move away from the rotor 120 in order to release the park brake, and causing the rotatable part 410 to rotate in the direction of releasing the brake (step 950).

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. An electromechanical parking brake system, comprising:
  a strut mechanism comprising:
    a strut configured to be selectively engageable with one of notches, formed on a rotatable part operably connected with a brake actuator, by being movable between an engaged position where the strut is interlocked with one of the notches formed on the rotatable part to prevent rotation of the rotatable part in one direction of releasing a brake and allow rotation of the rotatable part in an other direction of applying the brake and a disengaged position where the strut is disengaged from one of the notches of the rotatable part to allow the rotation of the rotatable part in both the directions of applying and releasing the brake, and a strut return spring configured to exert a force moving the strut toward the disengage position; and a parking lock actuator having a pin configured to be movable between actuated and unactuated positions, the parking lock actuator configured to lock a parking brake by actuating to move the pin from the unactuated position to the actuated position so that the pin moves the strut from the disengaged position to the engaged position and, when the strut is interlocked with one of the notches formed on the rotatable part operably connected with the brake actuator, being unactuated to return the pin from the actuated position to the unactuated position such that the strut remains in engaging with one of the notches formed on the rotatable part to prevent the rotation of the rotatable part in the one direction of releasing the brake and allow rotation of the rotatable part in the other direction of applying the brake, wherein the parking lock actuator comprises a connector configured to electrically connect the parking lock actuator with a circuit board, wherein a heat sink is positioned between the parking lock actuator and the circuit board, and the connector of the parking lock actuator passes through the heat sink.

2. The electromechanical parking brake system of claim 1, wherein interlock of the strut with one of notches causing the rotatable part not to rotate in the direction of releasing the brake is maintained unless the rotatable part is rotated in the direction of applying the brake.

3. The electromechanical parking brake system of claim 1, wherein the brake actuator is configured to, in response to a signal for releasing the parking brake, rotate the rotatable part in the direction of applying the brake so that the strut is disengaged from one of the notches of the rotatable part by the force exerted by the strut return spring, and after the strut is disengaged from one of the notches of the rotatable part, rotate the rotatable part in the direction of releasing the brake in order to release the parking brake.

4. The electromechanical parking brake system of claim 1, wherein the parking lock actuator comprises a solenoid configured to move the pin in response to a current supplied to the solenoid.

5. The electromechanical parking brake system of claim 1, wherein the rotatable part operably connected with the brake actuator comprises a first surface facing a circuit board, a second surface facing the strut, and a curved surface positioned between the first and second surfaces, wherein the notches are formed on the second surface of the rotatable part facing the strut.

6. The electromechanical parking brake system of claim 1, wherein the strut is configured to be pivotally rotatable between the engaged position and the disengaged position.

7. The electromechanical parking brake system of claim 6, wherein the parking lock actuator is configured to linearly move the pin between the actuated position and the unactuated position.

8. The electromechanical parking brake system of claim 1, wherein the parking lock actuator comprises a pin return spring configured to exert a force moving the pin of the parking lock actuator toward the unactuated position so that the pin of the parking lock actuator is returned to the unactuated position by the force of the pin return spring when the parking lock actuator is unactuated.

9. The electromechanical parking brake system of claim 1, wherein the pin of the parking lock actuator or a direction of linear movement of the pin of the packing lock actuator is parallel to an axis of which a brake rotor rotates.

10. The electromechanical parking brake system of claim 1, wherein each of the notches has first and second surfaces angled asymmetrically to prevent the rotation of the rotatable part in one direction of releasing the brake and allow the rotation of the rotatable part in the other direction of applying the brake in a state that the strut is engaged with one of the notches.

11. A method of controlling an electromechanical parking brake system, the method comprising:

in response to a signal for applying a parking brake, applying, by a brake actuator, a brake clamping force to a rotor;

after the brake clamping force is applied to the rotor, energizing a parking lock actuator having a pin to cause the pin to be moved toward a strut so that the strut is moved from a disengaged position to an engaged position by the pin of the parking lock actuator, wherein in the engaged position the strut is interlocked with one of notches formed on the rotatable part to prevent rotation of the rotatable part in one direction of releasing the brake and allow rotation of the rotatable part in an other direction of applying the brake, and in the disengaged position the strut is disengaged from one of the notches of the rotatable part to allow the rotation of the rotatable part in both the directions of applying and releasing the brake; and after the strut is engaged with one of the notches formed on the rotatable part, de-energizing the parking lock actuator such that the pin is moved away from the strut by an elastic force exerted by a pin return spring, wherein the parking lock actuator comprises a connector configured to electrically connect the parking lock actuator with a circuit board, wherein a heat sink is positioned between the parking lock actuator and the circuit board, and the connector of the parking lock actuator passes through the heat sink.

12. The method of claim 11, wherein interlock of the strut with one of notches causing the rotatable part not to rotate in the direction of releasing the brake is maintained unless the rotatable part is rotated in the direction of applying the brake.

13. The method of claim 11, further comprising:

in response to a signal for releasing the parking brake, rotating the rotatable part in the direction of applying the brake so that the strut is disengaged from one of the notches of the rotatable part by an elastic force exerted by a strut return spring; and after the strut is disengaged from one of the notches of the rotatable part, rotating the rotatable part in the direction of releasing the brake in order to release the parking brake.

14. The method of claim 11, wherein the strut is configured to be pivotally rotatable between the engaged position and the disengaged position.

15. The method of claim 14, wherein the parking lock actuator is configured to linearly move the pin in response to a current supplied to the parking lock actuator.

16. The method of claim 11, wherein each of the notches has first and second surfaces angled asymmetrically to prevent the rotation of the rotatable part in one direction of releasing the brake and allow the rotation of the rotatable part in the other direction of applying the brake in a state that the strut is engaged with one of the notches.

17. The method of claim 11, further comprising, after the brake clamping force is applied to the rotor and before the parking lock actuator is energized, decreasing torque generated by the brake actuator.

18. The method of claim 11, further comprising, after de-energizing the parking lock actuator such that the pin is moved away from the strut, verifying whether a park set is performed successfully, and if the park set is not performed successfully, repeating the applying of the brake clamping force, the energizing of the parking lock actuator, and the de-energizing of the parking actuator.

\* \* \* \* \*